Figure 1:
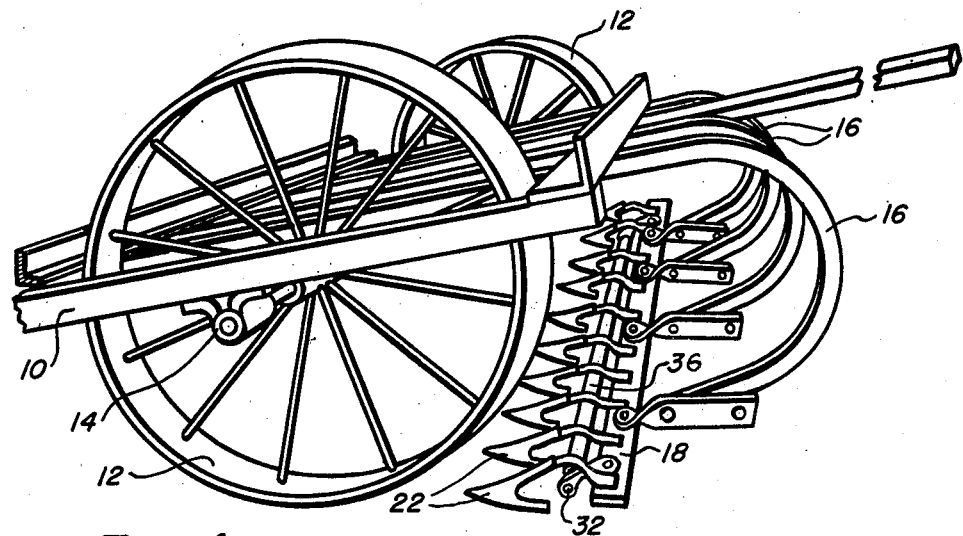

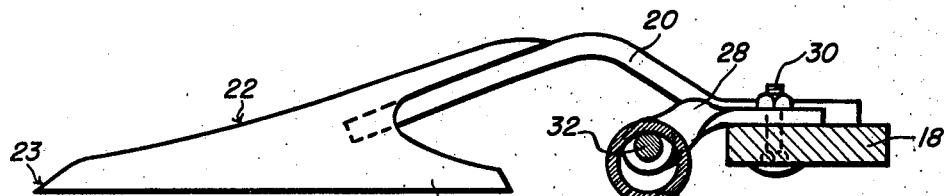
FIG_4
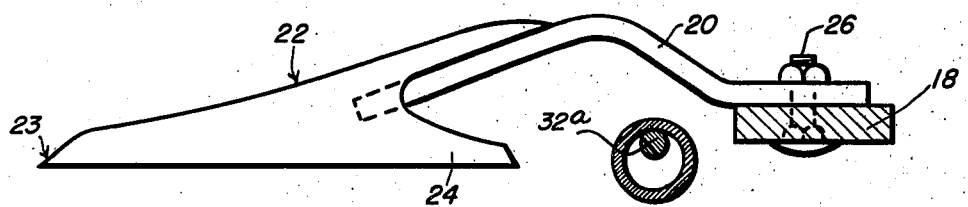
FIG_5
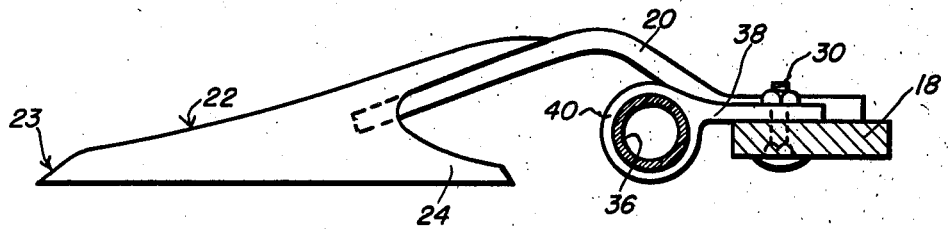
FIG_6
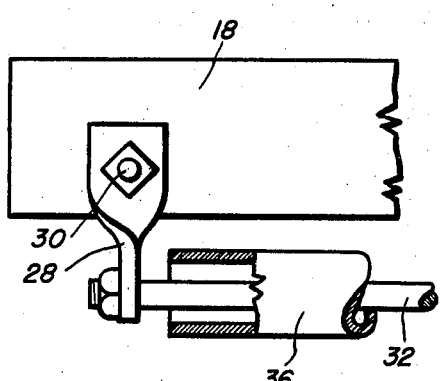
FIG_7
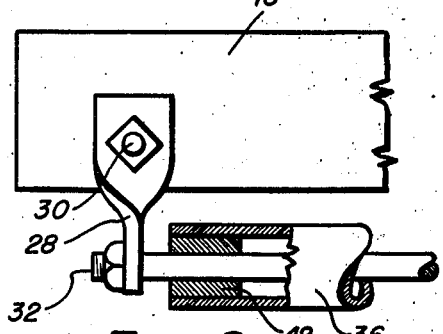
FIG_8
SYLVESTER J. WILLIAMS
INVENTOR
BY Herbert E. Smith
ATTORNEY Patented June 8, 1943

2,321,537

UNITED STATES PATENT OFFICE 2,321,537

WEEDER

Sylvester J. Williams, Ritzville, Wash., assignor to Claud C. Calkins, Spokane, Wash.

Application April 27, 1942, Serial No. 440,632

10 Claims. (Cl. 97—42)

My invention relates to weeders, and more particularly to weeders of the type in which a revolving elongated weeder member is passed through the earth slightly below its surface.

In the prior art it has been customary to pass a revolvable member through the earth slightly below its surface by the use of earth-penetrating bearing shoes supported on downwardly directed goosenecks. It is also known in the art to employ, in connection with the earth-penetrating shoes, plow shovels which have lateral wings for cutting or parting the earth in advance of the shoe and of the elongated weeder elements only adjacent to shoes. With this construction, however, it is only taught to employ the plow shovels on shoes that are spaced relatively great distances apart so that between pairs of shovels there is a relatively great distance in the earth which is not parted or broken up by the shovels. Usually, not more than four such plow shovels are used on each machine, and the capacity of the plow shovels to break up the surface to prepare the latter for the operation of the rotatable weeder member has been very limited.

Also in the prior art devices it has previously been thought necessary to rotate the weeder member in a positive manner from a remote point of drive. Quite customarily this weeder member is rotated by a drive shaft to which it is coupled by a universal joint. The driven shaft is angularly disposed upward to a point where power is supplied from a ground wheel, drive sprocket or in any other means. Since the devices are primarily designed for use in fields that quite often have standing stubble and growing vegetable matter on them, great quantities of trash accumulate on this angularly disposed drive rod and impede the operation of the machine causing removal by hand and making the weeding operation expensive and unduly slow.

Having in mind the defects of the prior art weeders, it is an object of my invention to provide a weeder that is effective and efficient for field weeding and which does not require the positive application of power thereto to produce effective weeding, cultivating of the soil and preparation of the surface for conservation purposes, etc.

Another object of the invention is to provide in a weeder of the type described a rotatable member which is caused to turn upon contact with the earth through which it is passed.

A still further and more specific object of my invention is to provide, in a weeder of the type described, a means that will effectively prepare the ground by breaking it up over the entire surface in advance of the rotatable weeder element for the full length of the same.

Still another object of my invention is the provision, in a weeder of the type described, of a support means for the weeder element and ground breaking means, all adapted to be passed through the earth.

The foregoing objects and others ancillary thereto, I prefer to accomplish as follows:

According to a preferred embodiment of my invention, I mount upon downwardly directed arms, and across the lower end of the same, a horizontal bar which extends throughout the width of a weeding machine. This bar is provided with suitable bearings or journals of brackets for the mounting of an elongated rotatable member, or members which may take the form of a rod or a tube. Preferably, I mount this rotatable member or an aligned series of them in the manner of a roller which is loosely fitted to an axle that is carried by brackets attached to the horizontal bar. Also attached to the horizontal bar and extending throughout its length is a plurality of plow shovel brackets each of which is adapted to position a winged plow or other shovel in advance of the rotatable weeder element. It is customary that these plow shovel members have a forward inclination to the penetration nose and they may have lateral wings which extend toward adjoining shovels substantially half the distance of the spacing between pairs of such plow shovels. There are also certain modifications of my invention which relate more particularly to the manner of mounting for rotation the elongated weeder elements to meet varying conditions of manufacture as well as use.

Figure 2:
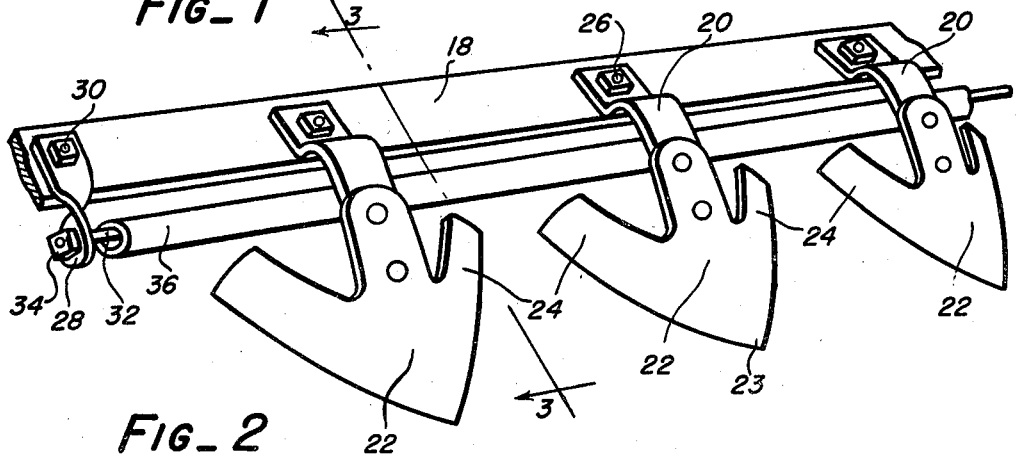
Figure 3:
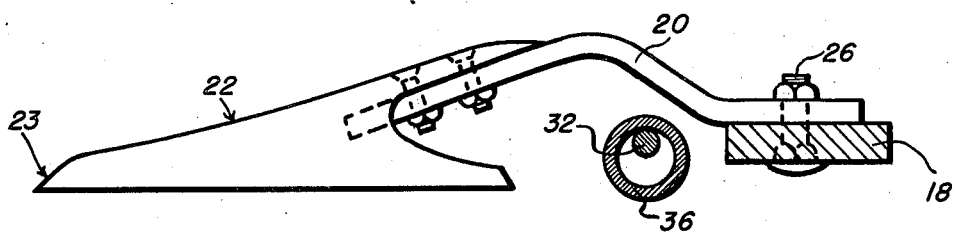

The novel features that I consider characteristic of my invention are set forth with particularity in the appended claims. The invention itself, however, both as to its organization and its method of operation, together with additional objects and advantages thereof, will be best understood from the following description of specific embodiments, when read in connection with the accompanying drawings, in which Figure 1 is a perspective view of my weeder and an associated frame by which it is supported and drawn through the ground, Figure 2 is a fragmentary perspective view of my weeder, Figure 3 is an enlarged cross-sectional view, taken on the line 3—3 of Figure 2, Figure 4 is an enlarged cross-sectional view taken along a plane similar to line 3—3 of Figure 2, and including a bracket bearing, Figure 5 is an enlarged cross-sectional view, similar to the showing of Figure 3, but illustrating a modification of the mounting of the rotatable weeder member, Figure 6 is an enlarged cross-sectional view taken on the plane of Figure 4 illustrating a modification of a manner of journalling the rototable weeder member, Figure 7 is a fragmentary plan view of an end of the horizontal rod with portions broken away and shown in section for convenience of illustration, Figure 8 is similar to the showing of Figure 7, and illustrates a modification of the manner in which the rotatable member is journaled upon an axle.

A weeder, to overcome the defects hereinbefore enumerated, must have at least two totally distinct characteristics; it must be capable of performing a weeding operation without the previously considered necessary input of power to the rotary weeding element; and it must also provide a weeding element which is operable under most if not all of the unusual and various surface and subsurface ground conditions that are to be encountered and to do so with permanence and utility. Accordingly, a preferred embodiment of my invention, referring to Figures 1 and 2 of the drawings, is constituted by a frame 10 which is usually formed of structural members in a rectangular shape, that has at either end ground engaging members which, in Figure 1, are shown to take the form of wheels 12 that have their axles journaled in bearings 14 on the frame 10. The frame is usually coupled behind draft means such as horse teams or tractors and moved thereby. In Figure 1 I have shown a plurality of downwardly directed arms or goosenecks 16 which carry on their lower ends a horizontal bar 18 in a manner that the latter is presented to the earth in a line transverse to the travel of the frame.

In spaced apart arrangement along the length of the horizontal bar 18, by means of brackets 20, I mount a gang or series of plow shovels 22. Each plow shovel has a forwardly directed sloping nose 23 and side wings 24 that extend laterally toward adjoining plow shovels. The brackets 20 are secured to the bar 18 by a conventional bolt and nut arrangement indicated by the numeral 26.

To the bar 18 at its ends and intermediate thereof, as desired, are journal brackets 28 which are attached also by a bolt and nut arrangement at 30. Passing through the brackets 28, as can be clearly seen in Figure 2, is a bolt 32 having end nut 34 to retain it as placed. On the bolt, mounted for free rotation in trailing relation to the plow shovels and in advance of the horizontal bar, is an elongated weeding member 36. In Figures 2, 3, 4 and 5 the weeding member is shown as constituting a tube or hollow cylinder having somewhat greater cross-sectional area than the cross-section of the bolt 32, so that the device will freely rotate upon contact with the earth during use.

In Figure 3 the bolt 32 is shown as positioned directly in advance of the bar 18, whereas in Figure 5 the bolt 32A is disposed forwardly of or in advance of the bar 18, but at about on the lowest level of the bar 18 during its travel through the ground.

In Figure 6 a modified form of journal for the weeding member 36 is shown. In this case a bracket 38 having a journal 40 on its outer end is attached to bar 18 and the journal encircles the outside of the weeding member and permits its free rotation.

Referring to Figures 7 and 8, the former shows the end construction of the arrangement of Figure 3. Figure 8 illustrates the modification wherein the weeding member 38 has its end closed by a bushing 42 which fixes the axis of rotation of member 36 with relation to the axis of the bolt 32.

It is to be understood that in use the plow shovel, the elongated rotary weeder member, and the horizontal bar are all passed through the earth at a desired distance below its surface. Each of the plow shovels having laterally disposed wings that make a horizontal cut through the earth and loosen it for the trailing rotary weeding member and the horizontal bar. Such weed roots and the like as may be encountered by the rotary member are engaged by said rotary member, are uprooted by the rolling action of said member, and are severed from the earth according to the operation of a rotary weeder. Tough growth or other matter that has a tendency to straddle the rotary member is rolled free. Also, the rotatable member by reason of its location serves to clear or keep clear the horizontal supporting bar 18, at the rear of the shovels, of trash which might otherwise accumulate and impede the operation of the weeder. By reason of thorough experimentation, I have determined that, while the elongated weeding member operates best directly in advance of or slightly below the horizontal supporting bar 18, under certain conditions it may also be placed slightly above said bar, although always in advance thereof.

I have found also that it is preferable that the rotatable member, in the case of the showing of Figures 3 and 4, may best be somewhat larger than the supporting axle so that it will freely rotate and to a degree clear itself when soil is forced between the tube 36 and the axle 32. However, the modification shown in Figure 6 eliminates the supporting axle and the rotatable member is supported entirely by encircling journals that are carried on brackets from the horizontal supporting bar 18.

As further modification (referring to Figure 8) I bush the end of the rotatable tube to close its end and to provide a journal for mounting it upon the smaller rod 32.

In most cases where the member 36 is loosely journaled on rod 32 a wobbling rotation results, but in constructing the device, as in Figure 8, perfect axial rotation is possible. Under certain circumstances, the bushing member 42 may have an outer surface somewhat eccentric to its inner bore and in that case the rotatable tube 36 will, upon rotation, oscillate in the manner of a cam.

While in the several views shown in the drawings I have indicated a journal rod passing through the rotary member, it is contemplated that such journal may be a stub axle extending laterally a short distance from the brackets 28 and engaging the ends of the rotary element only, and that these latter elements may be sectional instead of continuous for the pull length of the weeder and have intermediate bearing supports or axles extending from the bar 18 to align all section members.

Having thus described my invention, I claim:
1. A weeder attachment, comprising: a flat horizontal bar, a series of plow shovels each having a shank attached to said bar, each of said plow shovels having an upper face inclined with respect to said bar, a horizontal weeding rod rotatably mounted along the edge of said bar and disposed between said bar and said plow shovels said weeding rod being free to rotate by the urgence imparted thereto solely by the passage of the rod over or through the earth.

2. A weeder, comprising: a frame having ground engaging members to support said frame above the ground, downwardly directed supporting members on said frame in spaced apart relation and supporting a horizontal bar across the line of travel of said frame, a series of plow shovels attached to said bar and positioned in advance thereof, and a horizontal rod rotatably mounted in advance of said bar and in trailing relation to said plow shovels said weeding rod being free to rotate by the urgence imparted thereto solely by the passage of the rod over or through the earth.

3. A weeder comprising a flat horizontal bar, means for advancing said bar through the earth below its surface, a series of plow shovels attached to said bar and positioned in advance thereof, and a horizontal weeding member mounted for rotation in advance of said bar and in trailing relation to said plow shovels said weeding member being free to rotate by the urgence imparted thereto solely by the passage of the member over or through the earth.

4. In a weeder of the type wherein a horizontal bar having a series of plow shovels in advance thereof is passed through the earth in a plane substantially following its surface, a horizontal weeding member mounted for free rotation upon contact with the earth in advance of said bar and in trailing relation to said plow shovels said weeding member being free to rotate by the urgence imparted thereto solely by the passage of the member over or through the earth.

5. In a weeder of the type wherein a horizontal bar having a series of plow shovels in advance thereof is passed through the earth in a plane substantially following its surface, a horizontal weeding roller mounted for free rotation in advance of said bar and in trailing relation to said plow shovels said weeding roller being free to rotate by the urgence imparted thereto solely by the passage of the roller over or through the earth.

6. In a weeder of the type wherein a horizontal bar having a series of plow shovels in advance thereof is passed through the earth in a plane substantially following its surface, a horizontal weeding tube mounted for free rotation upon contact with the earth in advance of said bar and in trailing relation to said plow shovels said weeding tube being free to rotate by the urgence imparted thereto solely by the passage of the tube over or through the earth.

7. A weeder attachment, comprising: a horizontal bar, a series of plow shovels attached to said bar and positioned in advance thereof, forwardly directed brackets on said bar, each said bracket having a bearing thereon, and a horizontal weeding member mounted in said bearings for free rotation in advance of said bar and in trailing relation to said plow shovels said weeding member being free to rotate by the urgence imparted thereto solely by the passage of the member over or through the earth.

8. A weeder attachment, comprising: a horizontal bar, a series of plow shovels attached to said bar and positioned in advance thereof, forwardly directed brackets on said bar, a bolt carried by said brackets in advance of said bar and in trailing relation to said plow shovels, and a roller mounted on said bolt for free rotation said weeding roller being free to rotate by the urgence imparted thereto solely by the passage of the roller over or through the earth.

9. A weeder attachment, comprising: a horizontal bar, a series of plow shovels attached to said bar and positioned in advance thereof, forwardly directed brackets on said bar, and a horizontal roller mounted between paired brackets for free rotation in advance of said bar and in trailing relation to said plow shovels said weeding roller being free to rotate by the urgence imparted thereto solely by the passage of the roller over or through the earth.

10. A weeder attachment, comprising: a flat horizontal bar, a series of plow shovels each having a shank attached to said bar, each of said plow shovels having an upper face inclined with respect to said bar, a sectional horizontal weeding element rotatably mounted along the edge of said bar and disposed between said bar and said plow shovels said weeding element being free to rotate by the urgence imparted thereto solely by the passage of the element over or through the earth.

SYLVESTER J. WILLIAMS.